(12) United States Patent
Lee (10) Patent No.: US 9,952,380 B2
(45) Date of Patent: Apr. 24, 2018

(54) BACKLIGHT UNIT AND DISPLAY DEVICE INCLUDING THE SAME (71) Applicant: Samsung Display Co., Ltd., Yongin-si, Gyeonggi-do (KR)

(72) Inventor: Chung Hui Lee, Cheongju-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 173 days.

(21) Appl. No.: 14/938,553

(22) Filed: Nov. 11, 2015

(65) Prior Publication Data

US 2016/0223741 A1 Aug. 4, 2016

(30) Foreign Application Priority Data

Feb. 2, 2015 (KR) ........................ 10-2015-0016228

(51) Int. Cl.
*G02F 1/13357* (2006.01)
*F21V 8/00* (2006.01)
*G02F 1/1335* (2006.01)
*G02F 1/1333* (2006.01)

(52) U.S. Cl.
CPC ........... *G02B 6/0091* (2013.01); *G02B 6/009* (2013.01); *G02B 6/0073* (2013.01); *G02B 6/0085* (2013.01); *G02F 1/133615* (2013.01); *G02F 2001/133317* (2013.01); *G02F 2001/133328* (2013.01); *G02F 2001/133628* (2013.01)

(58) Field of Classification Search
CPC .. G02B 6/0091; G02B 6/0073; G02B 6/0085; G02B 6/009; G02F 1/133615
See application file for complete search history.

(56) References Cited

U.S. PATENT DOCUMENTS

| 2010/0149835 | A1 | 6/2010 | Cho et al. | |
|---|---|---|---|---|
| 2011/0025944 | A1* | 2/2011 | Lee | ....................... G02B 6/0036 349/61 |
| 2012/0050648 | A1* | 3/2012 | Jang | ....................... G02B 6/009 349/65 |
| 2012/0075552 | A1* | 3/2012 | Lee | ....................... G02B 6/0091 349/62 |
| 2012/0162566 | A1 | 6/2012 | Shimomichi | |
| 2013/0343085 | A1 | 12/2013 | Qian et al. | |

FOREIGN PATENT DOCUMENTS

| EP | 2913706 A1 | 9/2015 |
|---|---|---|
| KR | 10-2006-0038711 A | 5/2006 |
| KR | 10-2012-0075136 A | 7/2012 |
| KR | 10-2012-0136879 A | 12/2012 |
| KR | 10-2014-0018045 A | 2/2014 |

OTHER PUBLICATIONS

European Search Report for European Patent Application No. 16151188.6, Euorpean Patent Office, dated Apr. 5, 2016, 8 pages, Munich, Germany.

* cited by examiner

*Primary Examiner* — Anh Mai
*Assistant Examiner* — Nathaniel Lee
(74) *Attorney, Agent, or Firm* — Innovation Counsel LLP (57) ABSTRACT A backlight unit that allows a slimmer design for a display device is presented. The backlight unit includes: a bottom chassis; a bracket accommodated in the bottom chassis and positioned at an edge of the bottom chassis; a light source unit including a substrate fixedly positioned on the bracket and a light source mounted on the substrate, the light source protruding toward a bottom of the bottom chassis; and a light guide plate disposed in the bottom chassis and transmitting light from the light source.

20 Claims, 11 Drawing Sheets

BACKLIGHT UNIT AND DISPLAY DEVICE INCLUDING THE SAME

CROSS-REFERENCE TO RELATED APPLICATION

This application claims priority to and the benefit of Korean Patent Application No. 10-2015-0016228 filed in the Korean Intellectual Property Office on Feb. 2, 2015, the entire content of which is incorporated herein by reference.

BACKGROUND (a) Relevant Field

The present disclosure relates to a backlight unit and a liquid crystal display (LCD) including the same.

(b) Description of the Related Art

A liquid crystal display (LCD) is one of the most widely used display devices today. Generally, the LCD displays an image by filling a liquid crystal material between an upper substrate formed with common electrodes, color filters, and the like, and a lower substrate formed with thin film transistors, pixel electrodes, and the like, applying different voltages to the pixel and common electrodes to generate an electric field, thereby changing arrangement of liquid crystal molecules, and finally adjusting transmittance of light. An LCD panel of the LCD is in itself a non-emissive type of light receiving element, so the LCD generally includes a backlight unit for supplying light to the LCD panel at a rear side thereof.

As a light source for the backlight unit, a cold cathode fluorescent lamp (CCFL) has been widely used, since it consumes less power and provides bright white light.

Recently, a light emitting diode (LED) has been gaining popularity since it has superior color reproducibility, a longer lifespan, and less power consumption.

The backlight unit may be classified into an edge type and a direct type depending on where a light source is positioned in relation to the LCD panel. In the edge type, a light source is positioned at a lateral side of the LCD panel to provide light through a light guide plate, whereas in the direct type, a light source is positioned at a rear side of the LCD panel to provide light thereto. In terms of space utilization and design aspects, there is a demand for a slimmer display device, making the thickness of a backlight unit a major factor in manufacturing the slimmer display device.

The edge type is preferable to the direct type for making a slimmer backlight unit. However, in the edge type of backlight unit, the edge closest to the light source is thicker than the other edges, posing a challenge in realizing a slimmer backlight unit.

The above information disclosed in this Background section is only for enhancement of understanding of the background and therefore it may contain information that does not form the prior art that is already known in this country to a person of ordinary skill in the art.

SUMMARY

The inventive concept pertains to a backlight unit and a display device including the same and allowing for a slimmer design.

In one aspect, the inventive concept pertains to a backlight unit that includes: a bottom chassis; a bracket accommodated in the bottom chassis and positioned at an edge of the bottom chassis; a light source unit including a substrate fixedly positioned on the bracket and a light source mounted on the substrate, the light source protruding toward a bottom of the bottom chassis; and a light guide plate disposed in the bottom chassis and transmitting light from the light source.

The light source may be positioned between the bracket and the light guide plate.

The light source may be a light emitting diode (LED) package, and a lateral side of a light emitting surface of the LED package may be mounted on the substrate.

A heat conducting member may be positioned between and in contact with the bracket and the LED package.

The bracket may include a groove at a bottom surface, and the bracket may be positioned such that a guide protruding from a bottom of the bottom chassis may be inserted into the groove.

The substrate may be positioned to contact the bracket, and is fixed to the bracket by a screw.

The substrate may be attached to the bracket by an adhesion member.

The backlight unit may further include a thermal insulating member positioned on the substrate.

The backlight unit may further include a mold frame for holding the display panel in place, and the mold frame may not be positioned at an edge where the light source unit is positioned.

The bottom chassis may further include a wall extending from edges of the bottom, and a bottom surface of the bracket may contact the bottom and one lateral side thereof may contact the wall.

A display device according to an exemplary embodiment includes a display panel, and a backlight unit for supplying light to the display panel. The backlight unit includes: a bottom chassis; a bracket accommodated in the bottom chassis and positioned at an edge of the bottom chassis; a light source unit including a substrate fixedly positioned onto the bracket and a light source mounted on the substrate, the light source protruding toward a bottom of the bottom chassis; and a light guide plate disposed in the bottom chassis and transmitting light from the light source.

The light source may be positioned between the bracket and the light guide plate.

The light source may be a light emitting diode (LED) package, and a lateral side of a light emitting surface of the LED package may be mounted on the substrate.

A heat conducting member may be positioned between the bracket and the LED package to contact them.

The bracket may include a groove at a bottom surface, and the bracket may be positioned such that a guide protruding from a bottom of the bottom chassis may be inserted into the groove.

The substrate may be positioned to contact the bracket, and may be fixed to the bracket by a screw.

The substrate may be attached to the bracket by an adhesion member.

The backlight unit may further include a thermal insulating member positioned on the substrate, and the display panel may be positioned on the thermal insulating member.

The backlight unit may further include a mold frame for fixing the display panel, and the mold frame may not be positioned on an edge where the light source unit is positioned.

The bottom chassis may further include a wall extending from edges of the bottom chassis, and a bottom surface of the bracket may contact the bottom and a lateral side of the bracket may contact the wall.

In the backlight unit according to the exemplary embodiment, since a printed circuit board (PCB) of the light source unit functions as the mold frame at the side where the light source unit is positioned (hereinafter referred to as a light input section), the mold frame may be omitted at the light input section. Accordingly, a thickness of the light input section may be reduced to make the slimmer display device. In addition, since the slimmer display device can be manufactured, there is an advantage in realizing a curved display.

DETAILED DESCRIPTION OF THE EMBODIMENTS

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc. are enlarged or exaggerated for clarity. It will be understood that when an element such as a layer, film, region, or substrate is referred to as being "on" another element, it may be directly on the other element or intervening elements may be present. In contrast, when an element is referred to as being "directly on" another element, there are no intervening elements present.

A liquid crystal display (LCD) including a backlight unit according to an exemplary embodiment will now be described in detail with reference to FIGS. 1 to 5.

Figure 1:
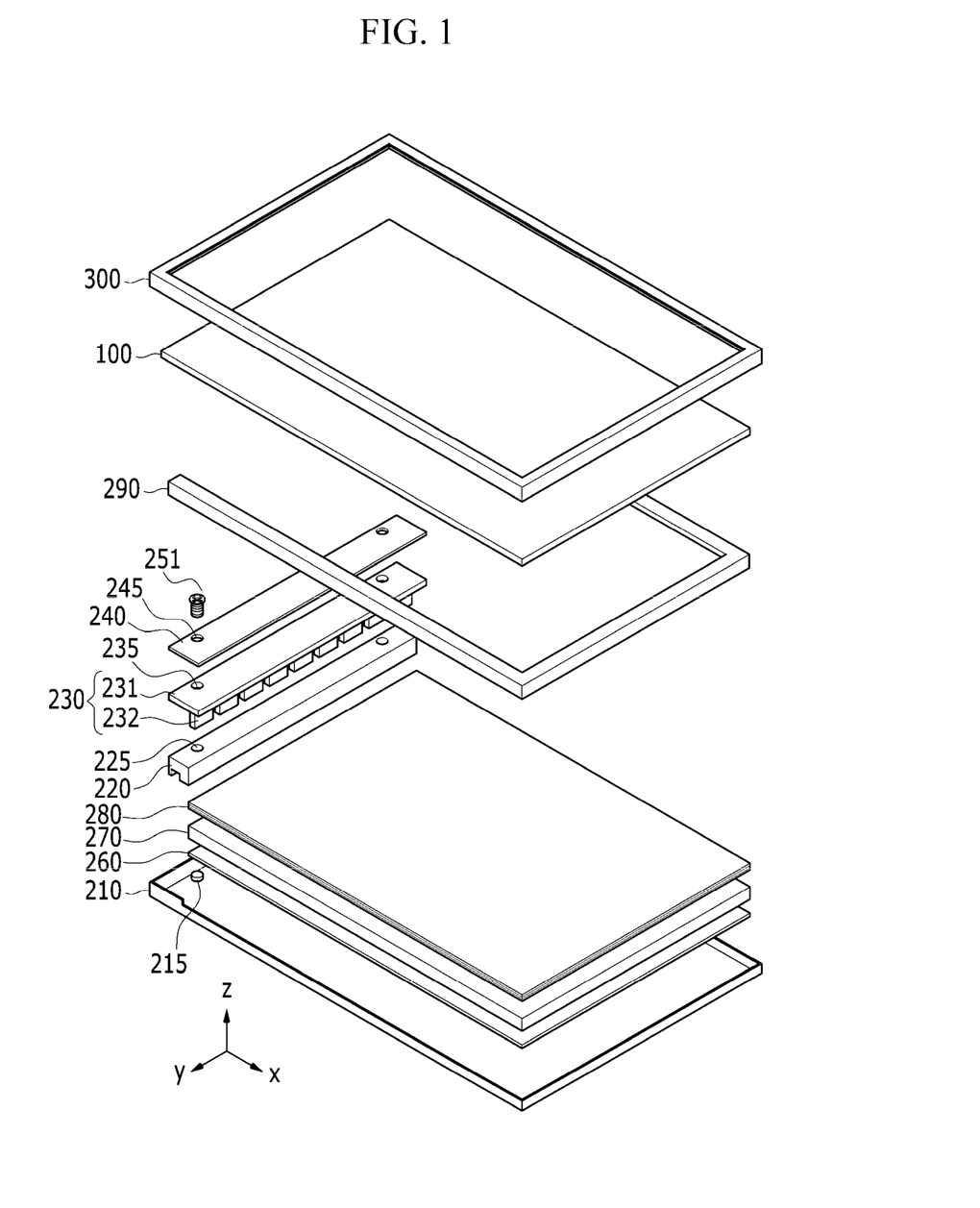
FIG. 1 is an exploded perspective view of a liquid crystal display (LCD) including a backlight unit according to an exemplary embodiment.
Figure 2:
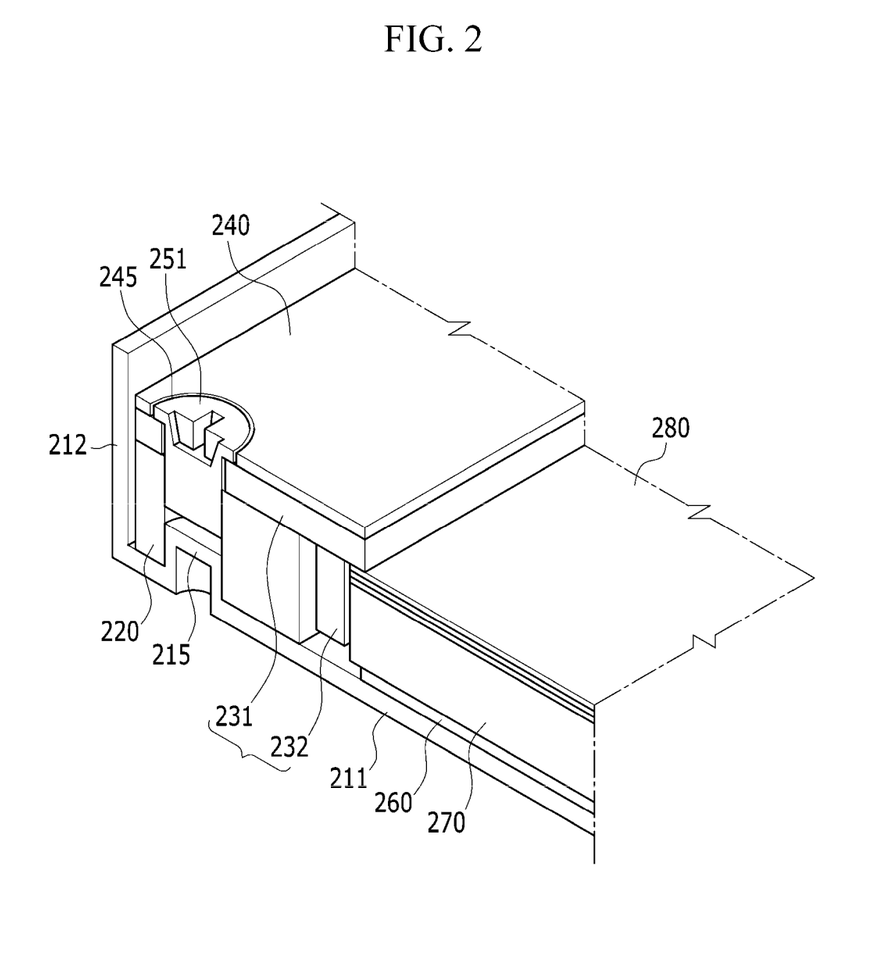
FIG. 2 is a perspective view showing a cross-section of the backlight unit illustrated in FIG. 1 taken from a side where a light input section is positioned.
Figure 3:
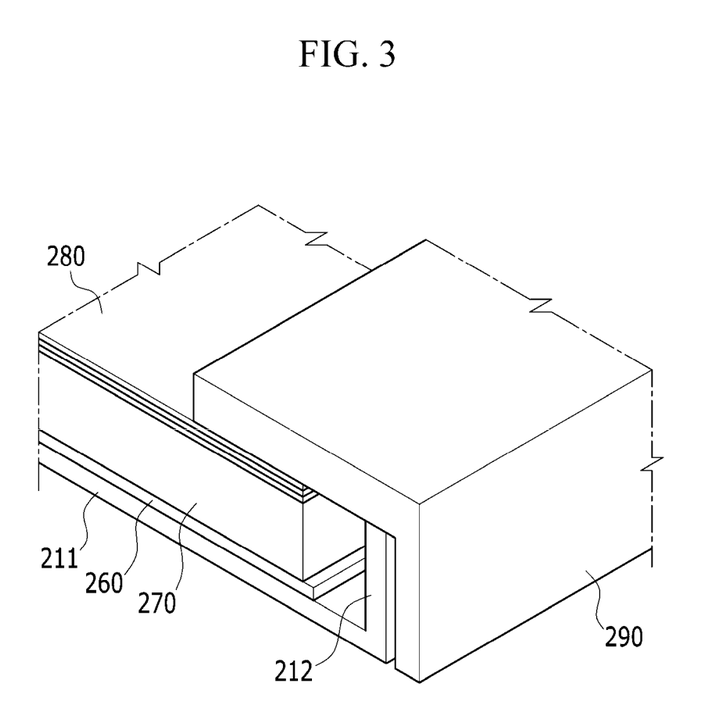
FIG. 3 is a perspective view showing a cross-section of the backlight unit illustrated in FIG. 1 taken from a side where the light source unit is not positioned.
Figure 4:
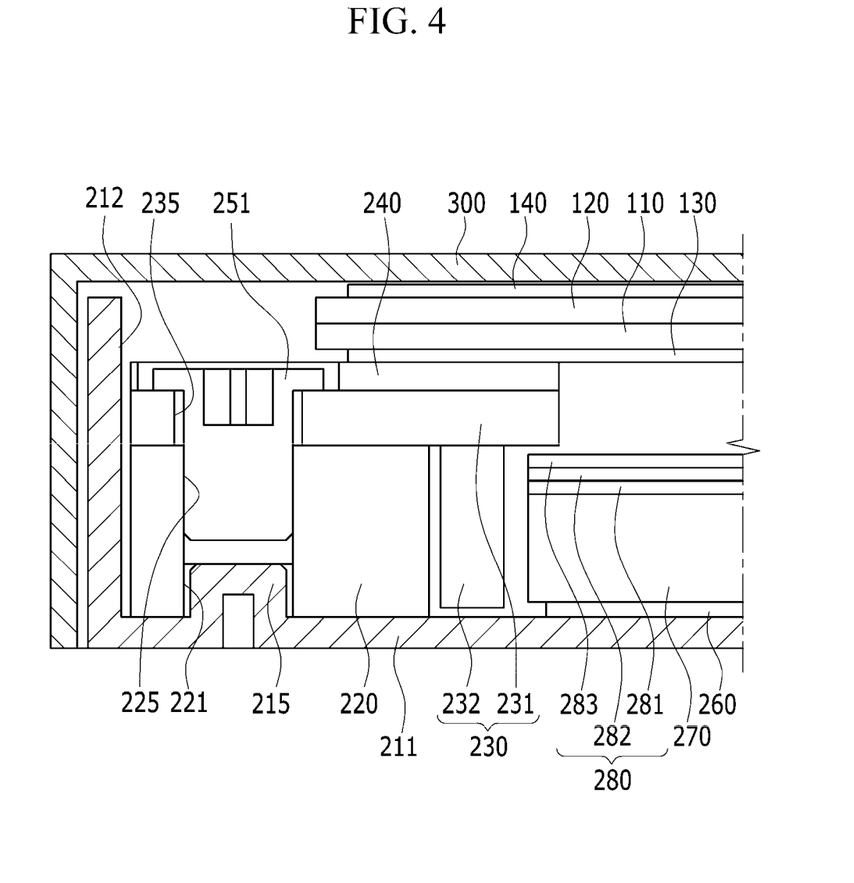
FIG. 4 is a cross-sectional view of the LCD illustrated in FIG. 1 taken from the side where the light input section is positioned.
Figure 5:
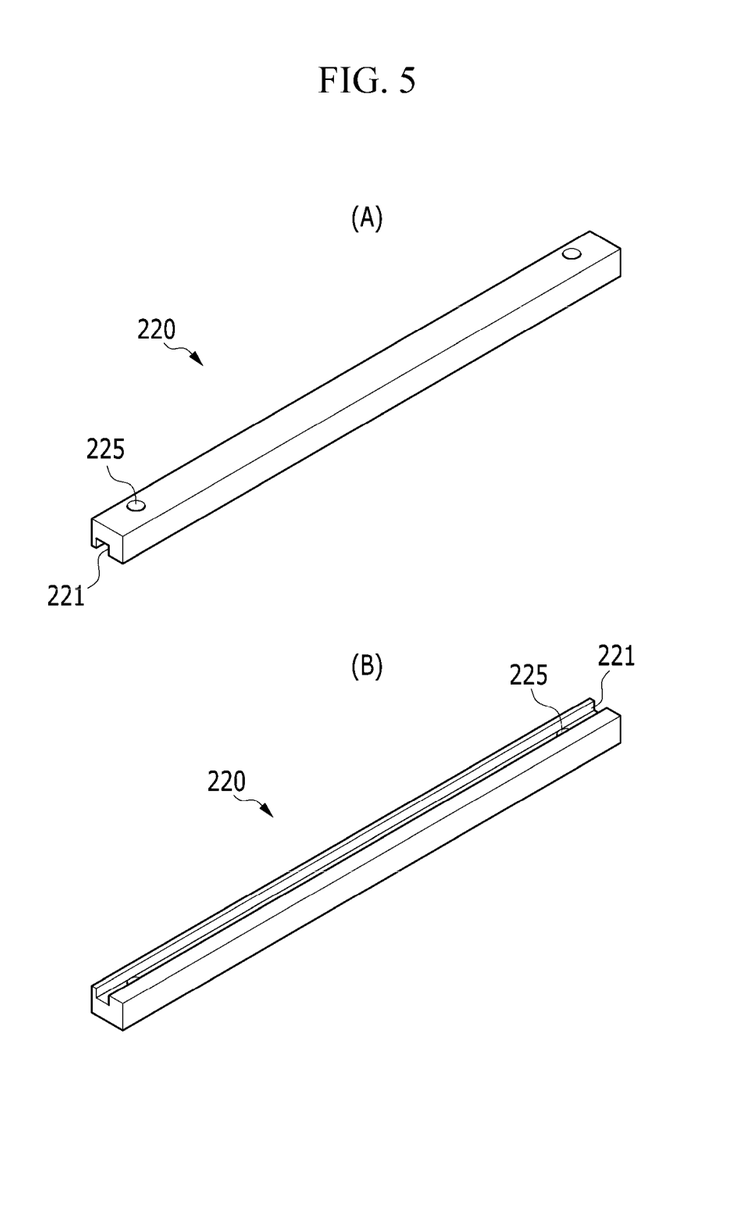
FIG. 5 is a perspective view of a bracket of the backlight unit according to the exemplary embodiment.

FIG. 1 is an exploded perspective view of an LCD including a backlight unit according to an exemplary embodiment of the inventive concept, FIG. 2 is a perspective view showing a cross-section of the backlight unit illustrated in FIG. 1 taken from a side where a light input section is positioned, FIG. 3 is a perspective view showing a cross-section of the backlight unit illustrated in FIG. 1 taken from a side where the light source unit is not positioned, and FIG. 4 is a cross-sectional view of the LCD illustrated in FIG. 1 taken from the side where the light input section is positioned. FIG. 5 is a perspective view of a bracket of the backlight unit according to the exemplary embodiment of the inventive concept.

Referring to FIGS. 1 and 2, the LCD basically includes an LCD panel 100 and a backlight unit 200. The backlight unit 200 supplies light to the LCD panel, and the LCD panel 100 controls the supplied light to display an image. The LCD further includes a top chassis 300 that protects the LCD panel 100 by enclosing its edges and prevents the LCD panel 100 from being separated from the backlight unit 200. In some exemplary embodiments, the top chassis 300 may be omitted.

The LCD panel 100 includes a lower display substrate 110, an upper display substrate 120, and a liquid crystal layer (not shown). The lower display substrate 110 and the upper display substrate 120 are attached to each other while maintaining a predetermined interval therebetween, and the liquid crystal layer is formed therebetween.

The lower display substrate 110 includes a transparent insulation substrate such as glass, and a plurality of thin film transistors, data lines, gate lines, pixel electrodes, etc. that are formed on the insulation substrate.

A data line is connected to a source terminal of a thin film transistor, and a gate line is connected to a gate terminal. A pixel electrode formed of a transparent conductive material such as indium tin oxide (ITO) is connected to a drain terminal of the thin film transistor.

The upper display substrate 120 positioned to face the lower display substrate 110 includes a transparent insulation substrate, and color filters, common electrodes, etc. that are formed on the insulation substrate. Each of the color filters may be included to represent primary colors such as red, green, and blue. A common electrode is formed of a transparent conductive material such as indium tin oxide (ITO) and indium zinc oxide (IZO). At least one of the color filter and the common electrode may be positioned in the lower display substrate 110.

Polarizers 130 and 140 are attached to a bottom surface of the lower display substrate 110 and to a top surface of the upper display substrate 120, respectively. The polarizers 130 and 140 may polarize incident light on the LCD panel 100 to allow light vibrating only in one direction to be transmitted.

In the LCD panel 100, when the thin film transistor is turned on by a signal applied to the gate line, a signal applied to the data line is applied to the pixel electrode. Then, an electric field of predetermined intensity is generated between the pixel electrode and the common electrode to control alignments of liquid crystal molecules of the liquid crystal layer. Accordingly, transmittance of light passing through the liquid crystal layer is controlled to display an image.

The liquid crystal display includes at least one driving device (not shown) such as a driver, and a controller that controls signals applied to the LCD panel 100. As an IC chip, the driving device may be mounted on the LCD panel 100 or on a printed circuit board (PCB) and a flexible printed circuit board (FPCB) to be electrically connected to the LCD panel 100. Some driving devices may be integrated into the LCD panel 100.

The backlight unit 200 is positioned below the LCD panel 100 to supply light to the LCD panel 100.

The backlight unit 200 includes a bottom chassis 210 and various components accommodated therein or fixed thereto. The bottom chassis 210 and each of the components will now be described. The bottom chassis 210 is open upward, so it is a kind of container having an accommodating space of a predetermined depth. The bottom chassis 210 may have, for example, an overall quadrangular tray-like shape. The bottom chassis 210 includes a substantially flat bottom 211, and a wall 212 that upwardly extends from edges of the bottom 211. Heights of the wall 212 may be the same in the four edges of the bottom chassis 210, at least one edge may have a different height, or even the same edge may have partially different heights. For example, the height of the wall 212 where a light source unit 230 of the backlight unit 200 to be described later is positioned (i.e., the light input section) may be greater than those of the wall 212 where the light source unit 230 is not positioned. At least one guide 215 is formed in the bottom 211 such that a bracket 220 to be described later is positioned around the edge near the light input section and maintains its original position. The guide 215 upwardly protrudes from the bottom 211. The guide 215 may protrude in a substantially circular cylindrical shape, but it is not limited thereto, and it may protrude, for example, in a quadrangular pillar shape, or may be elongated to protrude in parallel with the wall.

The bottom chassis 210 may be formed of a metallic material such as an aluminum plate, an aluminum alloy plate, or zinc-plated steel. In some exemplary embodiments, the bottom chassis 210 may be formed of a plastic material such as polycarbonate (PC).

In the bottom chassis 210, the bracket 220, the light source unit 230, a reflective sheet 260, a light guide plate 270, an optical sheet 280, etc. are accommodated. Among them, the bracket 220 and the light source unit 230 are placed near the edge of the bottom chassis 210 where the light input section is positioned.

The bracket 220 is positioned on the bottom 211 of the bottom chassis 210 at the edge thereof where the light input section is positioned such that the light source unit 230 can maintain a predetermined position. The bracket 220 may be positioned close to the wall 212 of the bottom chassis 210 as well as the bottom 211 thereof.

The bracket 220 is more specifically illustrated in FIG. 5. FIG. 5 (A) is a perspective view seen from above and FIG. 5 (B) is a perspective view seen from below. As illustrated, the bracket 220 may have an overall thin and long quadrangular bar shape. A groove 221 is formed in a bottom surface of the bracket 220 along a length direction thereof, and at least one hole 225 is formed to penetrate from a top surface to the bottom surface. In some exemplary embodiments, the hole 225 may be formed such that it does not penetrate the bracket 220.

The groove 221 is formed to be inserted into the guide 215 of the bottom chassis 210, allowing the bracket 220 to be fixed at a predetermined position. For this purpose, for example, the groove 221 may be formed such that it has substantially the same width as that of the guide 215 and a greater height than that of the guide 215 protruding from the bottom 211. In this case, "substantially having the same width" may mean "the width of the groove being slightly greater than that of the guide". When the widths are exactly the same, inserting one into another may be difficult if either one of the bracket 220 and the guide 215 is not an elastic body. The groove 221 has been exemplarily described such that it is elongated in the bracket 220 to be inserted into the guide 215, but in some exemplary embodiments, holes, instead of the groove 221, may be topically formed only at positions where the guides 215 are formed in accordance with a shape of the guide 215.

The bracket 220 may be formed of a metallic material having good thermal conductivity such that heat from the light source unit 230 may be transferred to the bottom chassis 210 to prevent the source unit 230 from being overheated. For example, the bracket 220 may be formed through extrusion molding of aluminum, an aluminum alloy, etc. However, a material for the bracket 220 is not limited to the metallic material, and for example, may be formed of a material such as a thermally conductive plastic.

The light source unit 230 includes a substrate 231 and a light source 232 mounted thereon, and a larger side of the substrate 231 is closely fixed onto the bracket 220, and the light source 232 downwardly protrudes from the substrate 231 to be positioned between the bracket 220 and the light guide plate 270.

The substrate 231 may have an overall elongated bar shape. The substrate 231 serves to support the light source 232 and supply power to the light source 232. The substrate 231 may be a circuit board, and particularly, a metal core printed circuit board (MCPCB).

In order to fix the substrate 231 onto the bracket 220, a hole 235 of the substrate 231 is formed at a position where the hole 225 of the bracket 220 is formed. After the penetration hole 235 of the substrate 231 is aligned to the hole 225 of the bracket 220, the substrate 231 may be fixed to the bracket 220 by tightening a screw 251 toward the hole 225 from the hole 235.

Since the substrate 231 is tightly attached to the bracket 220 and the bracket 220 is tightly attached to the bottom chassis 210, the heat generated from the light source 232 may be quickly transferred and discharged to the bottom chassis 210 through the substrate 231 and the bracket 220. That is, the substrate 231, the bracket 220, and the bottom chassis 210 may serve as a heat sink of the light source 232. For effective heat transfer and discharge, the substrate 231 and the bracket 220 may be formed of a material having a superior heat transfer characteristic, and for example, as described above, the substrate 231 may be the MCPCB and the bracket 220 may be formed of the metallic material.

The light source 232 is electrically connected to wires of the substrate 231 to receive power, and emits light by converting electrical energy into light energy. The light source 232 may be a light emitting diode (LED) package, and a plurality of light sources 232 may be positioned on the single substrate 231 at predetermined intervals. In this case, the LED package is mounted on the substrate 231 such that a light emitting surface faces the light guide plate 270.

Since the substrate 231 is fixed onto the bracket 220 and the light source 232 is positioned between the bracket 220 and the light guide plate 270, a horizontal surface of the substrate 231 and the light emitting surface of the LED package are substantially perpendicular to each other, and a rear side of the light emitting surface of the LED package rather than a lateral side thereof is mounted on the substrate 231. In addition to the LED package, other possible point or line light sources may be used as the light source 232. Since a wide surface of the substrate 231 of the light source unit 230 is fixed onto the bracket 220, an uppermost surface (i.e., top surface of the substrate 231) forms a flat surface along the edge of the bottom chassis 210 where the light input section is positioned while the substrate 231 is fixed onto the bracket 220. Accordingly, even if an additional mold frame on which the LCD panel 100 is placed is not provided to where the light input section is positioned, the substrate 231 serves as the mold frame to position the LCD panel 100 onto the top of the substrate 231. As a result, the mold frame may be removed from the light input section, thereby reducing a thickness of the light input section. Further, use of the mold frame decreases, so a manufacturing cost may be reduced.

However, when the LCD panel 100 is placed directly onto the substrate 231, heat generated from the light source 232 may be transferred to the LCD panel 100 through the substrate 231. Accordingly, a thin thermal insulating member 240 may be positioned on the substrate 231 to prevent the generated heat from being transferred to the LCD panel 100. The thermal insulating member 240 may be positioned to cover the entire top surface of the substrate 231 or at least some of the top surface thereof that overlaps LCD panel 100. The thermal insulating member 240 may be a heat insulating tape, and may be attached to the top surface of the substrate 231. In order to fix the substrate 231 to the bracket 220 through the screw 251, a hole 245 of the thermal insulating member 240 may be formed at a position where the hole 235 of the substrate 231 is formed.

The light guide plate 270 is positioned on the bottom 211 of the bottom chassis 210 such that one edge faces the light source 232. The light guide plate 270 is used to guide the light emitted from the light source 232 such that the emitted light is transmitted to the LCD panel 100. The light guide plate 270 may be formed of polymethylmethacrylate (PMMA) having high light transmittance, polycarbonate (PC) having excellent strength and heat resistance, methylmethacrylate-styrene (MS) having excellent heat resistance and humidity resistance, or the like. The light guide plate 270 serves to convert the light generated from the light source unit 230, which has an optical distribution of a point or line light source, into light having an optical distribution of a surface light source, that is, to uniformly distribute the generated light. A flat or wedge plate may be used as the light guide plate 270, and one or both surfaces thereof may be formed with a pattern.

A reflective sheet 260 is positioned below the light guide plate 270, that is, between the light guide plate 270 and the bottom chassis 210. The reflective sheet 260 reflects the light traveling toward the light guide plate 270 such that the reflected light is finally directed toward the LCD panel 100, thereby improving optical efficiency. The reflective sheet 260 may be formed of a plastic material such as polyethylene terephthalate (PET), polycarbonate (PC), and polystyrene (PS). The reflective sheet 260 may include a light reflective material such as titanium dioxide $TiO_2$ to increase light reflectance.

The optical sheet 280 is positioned on the light guide plate 270. The optical sheet 280 may include a diffuser sheet 281, a prism sheet 282, a protecting sheet 283, etc. The diffuser sheet 281 is used to allow the light emitted from the light guide plate 270 to have uniform distribution, that is, to generate a surface light source of uniform brightness. The prism sheet 282 controls a traveling direction of the light diffused by the diffuser sheet 281 such that the traveling direction of the light is perpendicular to the LCD panel 100. The protecting sheet 283 may be used to protect a prism of the prism sheet 282 from scratches and the like. The protecting sheet 283 may also serve to widen a viewing angle that is previously narrowed by the prism sheet 282.

The optical sheet 280 may exclude one of the prism sheet 282 and the protecting sheet 283 while including a plurality of the others. The optical sheet 280 may further include an optical sheet having characteristics other than those described above. For example, the optical sheet 280 may include a reflective polarizer sheet that can improve luminance efficiency by separating, transmitting, and reflecting polarization components of light.

The backlight unit 200 includes a mold frame 290 that has a predetermined height to stably fix the LCD panel 100 to the backlight unit 200. As described above, since the substrate 231 of the light source unit 230 may serve as the mold frame in the light input section where the light source unit 230 is positioned, the mold frame 290 is not positioned in the light input section.

The mold frame 290 may be combined with the bottom chassis 210, for example, such that it is hooked and fastened to a hook (not shown) and the like that enclose the wall 212 of the bottom chassis 210. In this case, a part of the mold frame 290 may press the optical sheet 280 to limit movement of the optical sheet 280 as well as the light guide plate 270 and the reflective sheet 260 therebelow. The mold frame 290 may be formed in one piece or a plurality of pieces.

The LCD panel 100 is fixed onto the mold frame 290. The LCD panel 100 may be attached to a flat surface of the mold frame 290 through an adhesion member (not shown), and the adhesion member may be a double-sided cushion tape having impact-absorbing capability to reduce impacts applied to the LCD panel 100. In the light input section, the LCD panel 100 may be fixed onto the thermal insulating member 240 that is positioned on the substrate 231 of the light source unit 230, or may not be fixed thereon but placed thereon.

Though not illustrated, an inverter board and/or a PCB for signal conversion may be mounted on a bottom surface of the bottom chassis 210 as a PCB for power supply. The inverter board converts an external power supply into a constant voltage level to supply it to the light source 232. The PCB for signal conversion may convert an analog data signal into a digital data signal to transmit it to the LCD panel 100 through the flexible printed circuit board attached to the LCD panel 100.

A process of supplying light of a backlight unit 200 having the aforementioned structure to an LCD panel 100 will now be briefly described. First, when power is supplied to a light source 232 through a substrate 231 fixed onto a bracket 220, the light source 232 generates and emits light. The emitted light is uniformly distributed while passing through a light guide plate 270 to be directed toward an optical sheet 280, and light emitted from a bottom 211 of a bottom chassis 210 is reflected by a reflective sheet 260 to be directed to the optical sheet 280. Subsequently, the light is diffused while passing through the optical sheet 280, and is controlled in its travelling direction such that it is supplied over an entire surface of the LCD panel 100.

Meanwhile, the light source 232 generates heat when generating the light. The generated heat is transferred to the bottom chassis 210 through the substrate 231 and the bracket 220 contacting each other in a wide area to be discharged to the outside. Since the heat is blocked by a thermal insulating member 240 positioned therebetween in a direction toward the LCD panel 100 positioned on the substrate 231, the heat may be prevented from being transferred to the LCD panel 100 from the substrate 231.

An LCD including a backlight unit according to another exemplary embodiment will now be described with reference to FIGS. 6 and 7.

Figure 6:
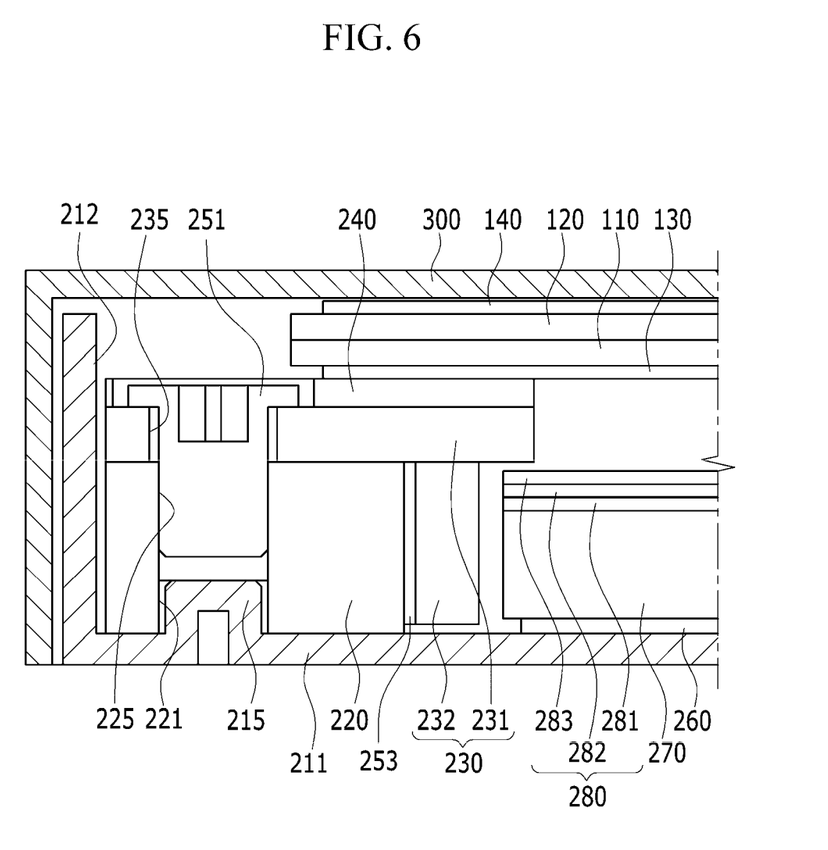
FIG. 6 is a cross-sectional view of an LCD including a backlight unit according to another exemplary embodiment taken from a side where a light input section is positioned.

FIG. 6 is a cross-sectional view of an LCD including a backlight unit according to another exemplary embodiment taken from a side where a light input section is positioned.

The exemplary embodiment of FIG. 6 is substantially the same as the aforementioned exemplary embodiment illustrated in FIGS. 1 to 5, but it is different in that a heat conducting member 253 is positioned between the bracket 220 and the light source 232. The substrate 231 of the light source unit 230 is fixed onto the top surface of the bracket 220, but the light source 232 is mounted only on the substrate 231 and there may be an interval between the light source 232 and the bracket 220. In the current exemplary embodiment, the heat conducting member 253 having a thickness corresponding to the interval is positioned between the bracket 220 and the light source 232 to allow the light source 232 to contact the bracket 220 through the heat conducting member 253. In this case, heat generated from the light source 232 may be partially transferred to the bracket 220 through the heat conducting member 253 without passing through the substrate 231, thereby improving heat dissipation efficiency. One side of the heat conducting member 253 may be attached to a lateral side of the bracket 220 or the light source 232, or both sides of the heat conducting member 253 may be respectively attached to lateral sides of the bracket 220 and the light source 232.

Figure 7:
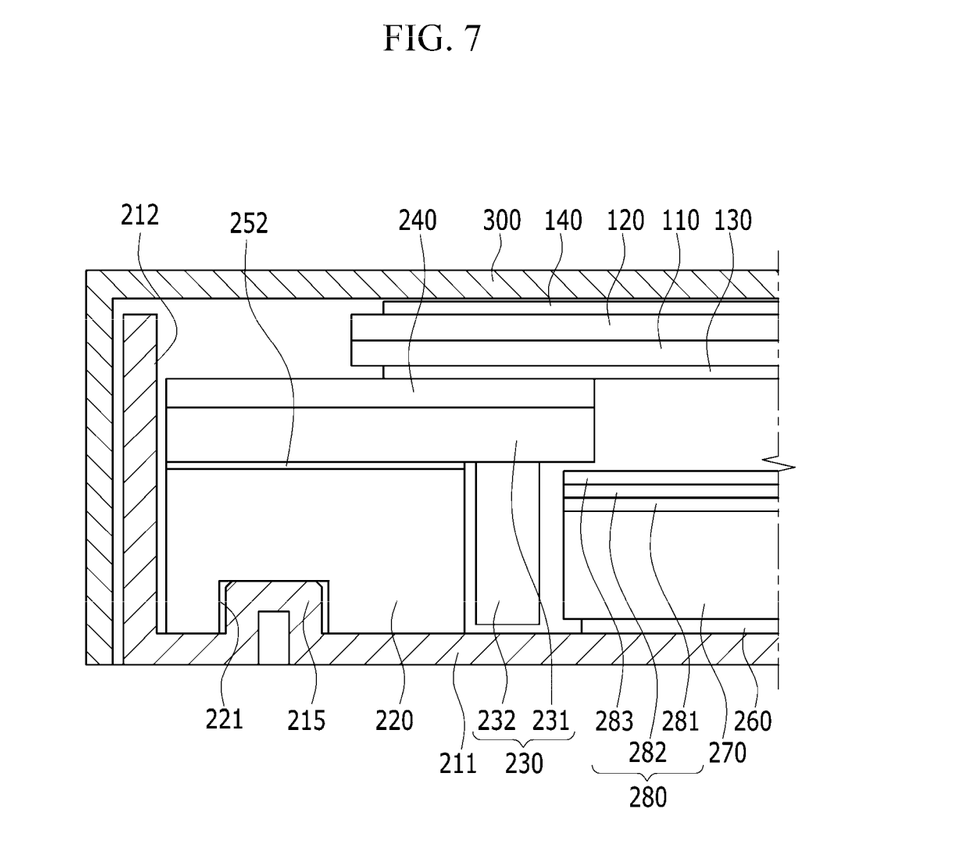
FIG. 7 is a cross-sectional view of an LCD including a backlight unit according to a further exemplary embodiment taken from a side where a light input section is positioned.

FIG. 7 is a cross-sectional view of an LCD including a backlight unit according to a further exemplary embodiment taken from a side where a light input section is positioned.

The exemplary embodiment of FIG. 7 is substantially the same as the aforementioned exemplary embodiment illustrated in FIGS. 1 to 5, but it is different therefrom in that a thin adhesion member 252 is positioned between the bracket 220 and the substrate 231. The substrate 231 and the bracket 220 are adhered by the adhesion member 252 such that the light source unit 230 is fixed to its original position. Accordingly, as in the aforementioned exemplary embodiment, there is no need to respectively form the holes 225 and 235 in the bracket 220 and the substrate 231, so there is no need to tighten the screw 251 into the holes 225 and 235. The adhesion member 252 may cause an overall thickness to increase by a thickness of the adhesion member 252, but there is no need to tighten the screw to fix the substrate 231 onto the bracket 220, as shown in the aforementioned exemplary embodiment, thereby reducing an assembly time. In addition, a manufacturing cost of parts can be reduced because a perforation process is eliminated.

Positions of a light source unit 230 and a mold frame 290 will now be described with reference to FIGS. 9 to 11.

FIGS. 8, 9, 10, and 11 are schematic diagrams for illustrating positions of a light source unit and a mold frame according to some exemplary embodiments.

Figure 8:
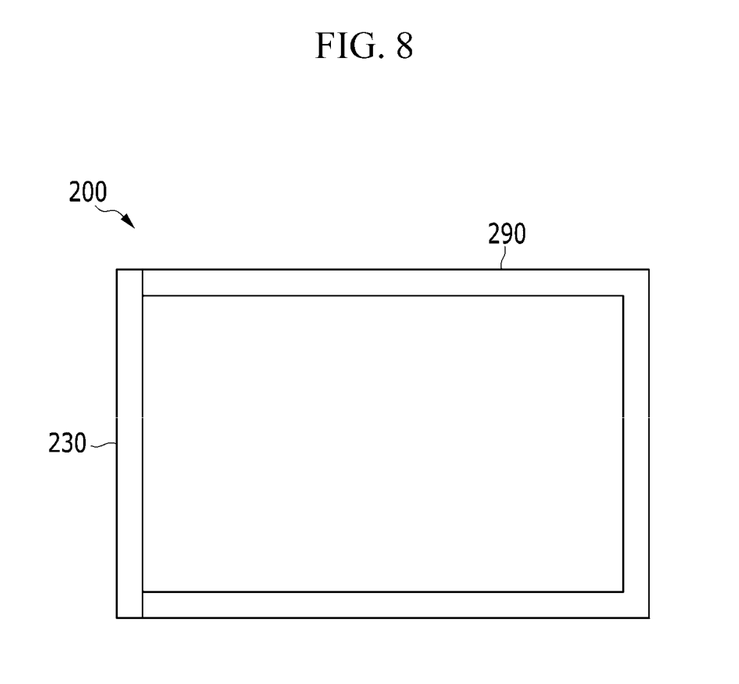
FIGS. 8, 9, 10, and 11 are schematic diagrams for illustrating positions of a light source unit and a mold frame according to some exemplary embodiments.
Figure 9:
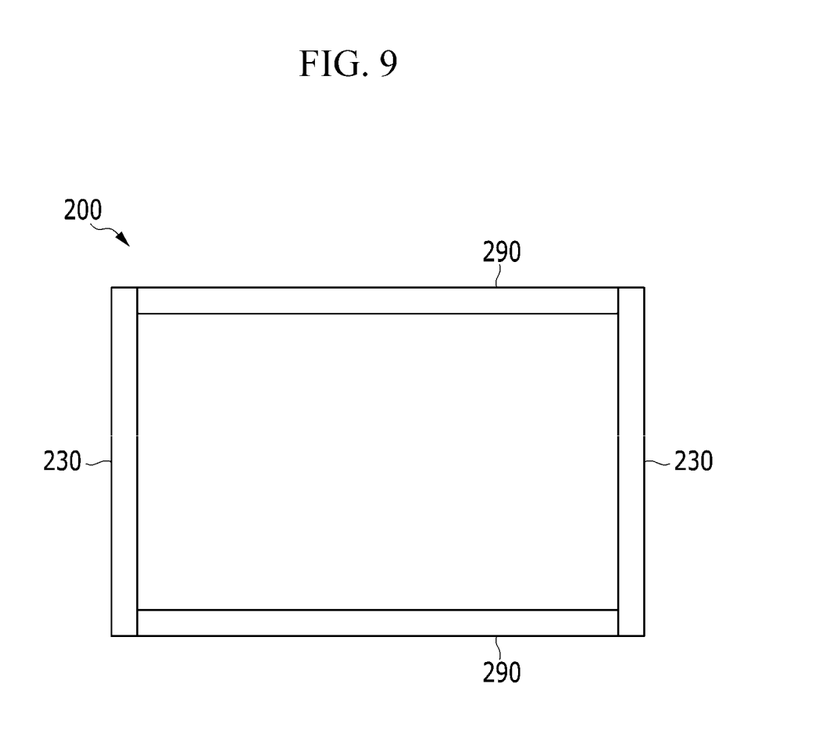
Figure 10:
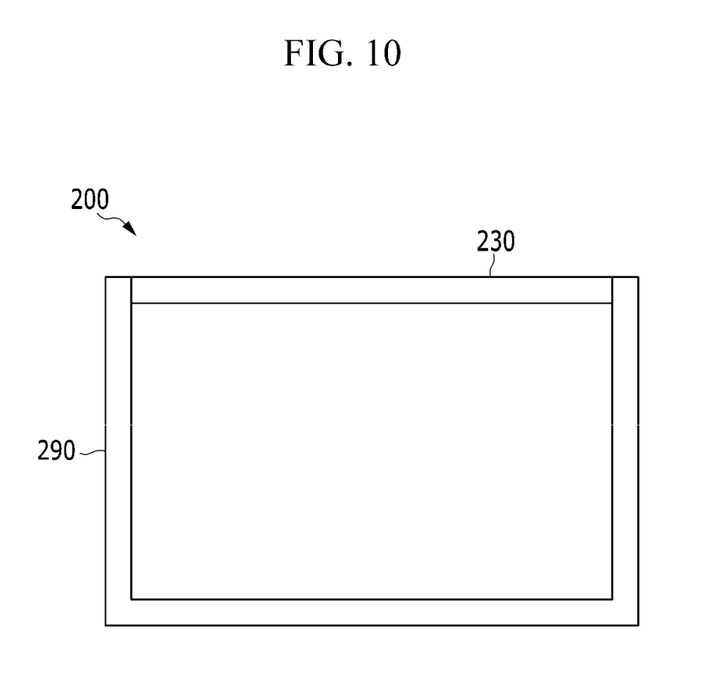

FIGS. 8 to 10 are schematic top plan views of the light source unit 230 and the mold frame 290 to show a positional relationship between the light source unit 230 and the mold frame 290. The backlight unit 200 may have a rectangular shape that is identical to that of a generic LCD panel. The backlight unit 200 has four edges, and two edges (long sides) thereof are relatively longer while the other two edges (short sides) are relatively shorter.

Referring first to FIG. 8, the light source unit 230 is positioned at one short side, while the mold frame 290 is positioned at the other short side and the two long sides. In the short side where the light source unit 230 is positioned (i.e., the light input section), the substrate 231 of the light source unit 230 provides a flat and wide surface on which one edge of the LCD panel may be placed, so the mold frame 290 is not positioned in the light input section. The mold frame 290 may be mounted on the other three edges to provide the flat surface on which the other three edges are positioned. The mold frame 290 may be formed in one piece or two or more pieces so as to be mounted.

In an exemplary embodiment of FIG. 9, the light source unit 230 is positioned on two short sides. The mold frame 290 is not positioned at the short sides where the light source unit 230 is positioned, but is positioned only at two long sides. The mold frame 290 positioned at each of the long sides may be formed in one piece or in a plurality of pieces.

Figure 11:
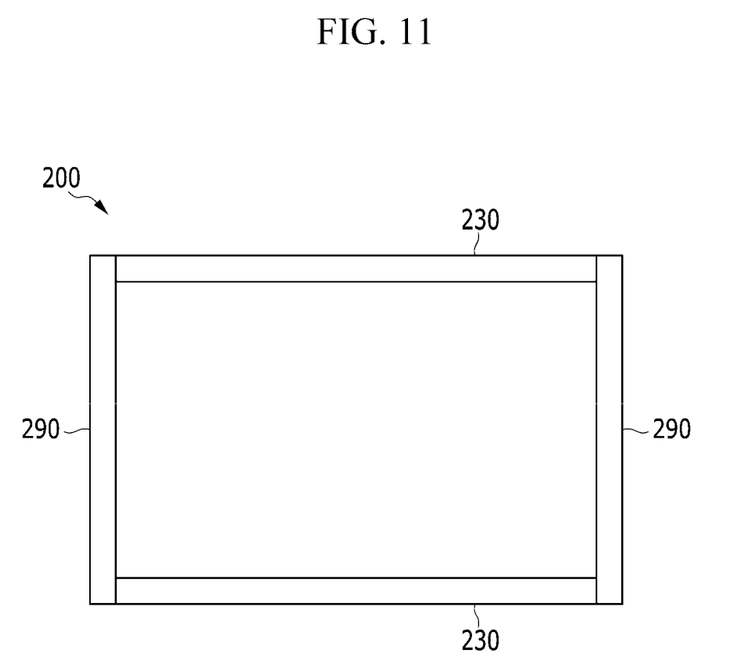

The exemplary embodiment of FIG. 10 and the exemplary embodiment of FIG. 11 are respectively similar to those of FIG. 8 and FIG. 9, but they are different in that the light source unit 230 is positioned at one long side. The mold frame 290 is not positioned at the long side where the light source unit 230 is positioned, but is positioned on the other long side and two short sides (FIG. 10) or only on two short sides (FIG. 11).

While this inventive concept has been described in connection with what is presently considered to be practical exemplary embodiments, it is to be understood that the concept is not limited to the disclosed embodiments, but, on the contrary, is intended to cover various modifications and equivalent arrangements included within the spirit and scope of the appended claims.

What is claimed is:

1. A backlight unit comprising:
   a bottom chassis;
   a bracket accommodated in the bottom chassis and positioned at an edge of the bottom chassis;
   a light source unit including a substrate fixedly positioned on the bracket and a light source mounted on the substrate, the light source protruding toward a bottom of the bottom chassis;
   a light guide plate disposed in the bottom chassis and transmitting light from the light source; and
   a mold frame positioned adjacent to a first end of the light source unit and a second end of the light source unit, wherein the mold frame does not overlap with the light source unit.

2. The backlight unit of claim 1, wherein the light source is positioned between the bracket and the light guide plate.

3. The backlight unit of claim 2, wherein the light source is a light emitting diode (LED) package, and a lateral side of a light emitting surface of the LED package is mounted on the substrate.

4. The backlight unit of claim 3, wherein a heat conducting member is positioned between and in contact with the bracket and the LED package.

5. The backlight unit of claim 2, wherein the bracket includes a groove at a bottom surface, and the bracket is positioned such that a guide protruding from a bottom of the bottom chassis is inserted into the groove.

6. The backlight unit of claim 5, wherein the substrate is positioned to contact the bracket, and is fixed to the bracket by a screw.

7. The backlight unit of claim 5, wherein the substrate is attached to the bracket by an adhesion member.

8. The backlight unit of claim 2, further comprising a thermal insulating member positioned on the substrate.

9. The backlight unit of claim 2, wherein the mold frame is configured to hold a display panel in place, wherein the mold frame is at a different edge from where the light source unit is positioned.

10. The backlight unit of claim 2, wherein the bottom chassis further includes a wall extending from edges of the bottom, and a bottom surface of the bracket contacts the bottom and one lateral side of the bracket contacts the wall.

11. A display device comprising a display panel, and a backlight unit for supplying light to the display panel,
    wherein the backlight unit includes:
    a bottom chassis;
    a bracket accommodated in the bottom chassis and positioned at an edge of the bottom chassis;
    a light source unit including a substrate fixedly positioned on the bracket and a light source mounted on the substrate, the light source protruding toward a bottom of the bottom chassis;
    a light guide plate disposed in the bottom chassis and transmitting light from the light source; and a mold frame positioned adjacent to a first end of the light source unit and a second end of the light source unit, wherein the mold frame does not overlap with the light source unit.

12. The display device of claim 11, wherein the light source is positioned between the bracket and the light guide plate.

13. The display device of claim 12, wherein the light source is a light emitting diode (LED) package, and a lateral side of a light emitting surface of the LED package is mounted on the substrate.

14. The display device of claim 13, wherein a heat conducting member is positioned between and in contact with the bracket and the LED package.

15. The display device of claim 12, wherein the bracket includes a groove at a bottom surface, and the bracket is positioned such that a guide protruding from a bottom of the bottom chassis is inserted into the groove.

16. The display device of claim 15, wherein the substrate is positioned to contact the bracket, and is fixed to the bracket by a screw.

17. The display device of claim 15, wherein the substrate is attached to the bracket by an adhesion member.

18. The display device of claim 12, wherein the backlight unit further includes a thermal insulating member positioned on the substrate, and the display panel is positioned on the thermal insulating member.

19. The display device of claim 12, wherein the mold frame is configured to fix the display panel, and the mold frame is not positioned on an edge where the light source unit is positioned.

20. The display device of claim 12, wherein the bottom chassis further includes a wall extending from edges of the bottom chassis, and a bottom surface of the bracket contacts the bottom and a lateral side of the bracket contacts the wall.

* * * * *